May 6, 1969 J. O. KELLEY 3,442,373

TAPE REEL CARTRIDGE

Filed July 12, 1967

INVENTOR
JERRY O. KELLEY
BY
Trask, Jenkins & Hanley
ATTORNEYS

United States Patent Office 3,442,373
Patented May 6, 1969

3,442,373
TAPE REEL CARTRIDGE
Jerry O. Kelley, Columbus, Ind., assignor to Arvin Industries, Inc., Columbus, Ind., a corporation of Indiana
Filed July 12, 1967, Ser. No. 652,792
Int. Cl. B65h *53/00, 75/02;* B65d *85/04*
U.S. Cl. 206—52 6 Claims

ABSTRACT OF THE DISCLOSURE

A cartridge for use in housing a reel of magnetic tape comprising inner and outer arcuate shells open at their inner circumferences. The inner shell is rotatably received within the outer shell for movement between a cartridge-closed position in which the shells form a complete annulus, open only at its inner circumference, and a cartridge-open position in which the open inner circumferences of the shells are aligned. Thus, the cartridge in its closed position will house and protect a reel of tape, and in its open position will permit the tape to be removed from said cartridge and reel by any suitable tape drive.

*Background of the invention*

Frequently reels for holding magnetic tape comprise spools having radial flanges to protect said tape and guide it when it is being wound on or off the reel. A loaded reel is generally stored in a can or other protective package, and the reel must be manually removed therefrom when it is placed on a tape deck. Some cartridges are available which dispense with the requirement of handling the reel of tape but these special cartridges require the use of a continuous loop of endless tape.

It is an object of this invention to provide a cartridge for housing a flanged or flangeless reel of magnetic tape and which will permit the tape to be automatically removed from the cartridge without the necessity of handling the reel.

*Summary of the invention*

In accordance with the preferred form of the invention, there is provided a cartridge for enclosing a reel of magnetic tape and comprising a pair of inner and outer arcuate shells, each of which is open at its inner circumference. The inner shell, which has a greater arcuate extent than the outer shell, is rotatably carried within the outer shell for movement between a cartridge-closed position in which the shells are in opposed relation and a cartridge-open position in which the shells are in alignment with each other. With the cartridge in closed position, a reel of magnetic tape can be housed therein in a protected position, and with the cartridge in open position, the tape can be wound on and off of said reel. Conveniently, said shells are provided with guide means for guiding the movements of the inner shell between cartridge-open and closed positions.

*Brief description of the drawings*

The accompanying drawing illustrates the invention. In such drawing.

*Description of the preferred embodiment*

Figures 1, 2, 3, 4:
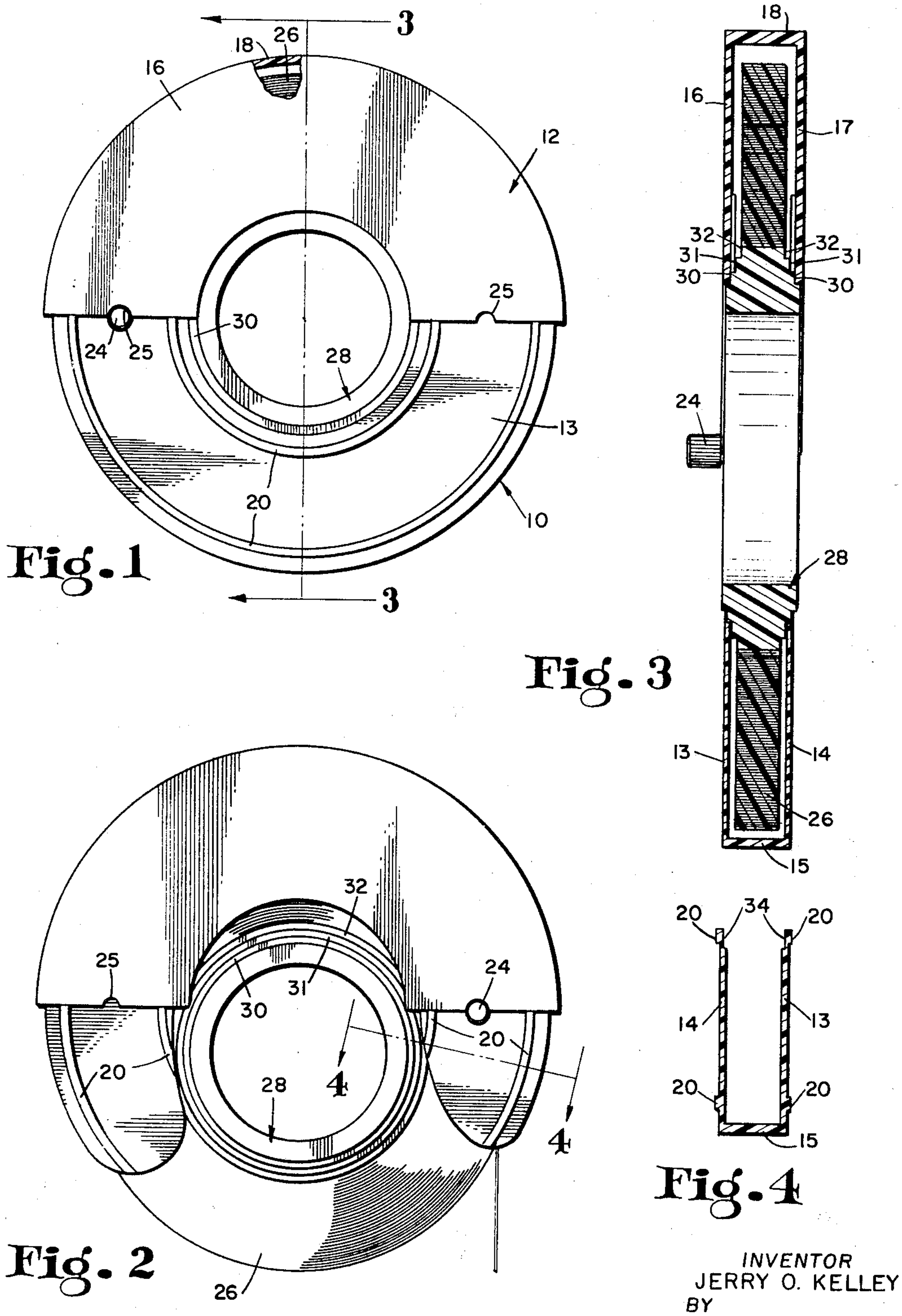
FIG. 1 is a plan view of a tape cartridge embodying the invention.
FIG. 2 is a plan view of the cartridge shown in FIG. 1, but showing said cartridge in open position.
FIG. 3 is an enlarged vertical section taken on line 3—3 of FIG. 1.
FIG. 4 is an enlarged vertical section taken on line 4—4 of FIG. 3.

As shown, my cartridge comprises a pair of arcuate inner and outer shells 10 and 12 having channeled cross-sections. The inner shell, which is rotatably mounted in the outer shell, comprises upper and lower parallel walls 13 and 14 interconnected by an arcuate outer end wall 15, and the outer shell comprises upper and lower parallel walls 16 and 17 interconnected by an arcuate outer end wall 18. As shown in FIG. 3, the walls 13 and 14 are slidably supported against the walls 16 and 17, and wall 15 has a radius slightly smaller than wall 18 to permit shell 10 to be rotated into shell 12 to dispose said shells in aligned relationship and the cartridge in its open position shown in FIG. 2.

As shown in FIG. 2, the walls 16–18 have an arcuate extent of about 90°. The wall 15 has an arcuate extent of about 150°, and the walls 13 and 14 have arcuate extents of about 160°. In this manner, the shell 10 is supported within shell 12 irrespective of whether the shells are in opposed relationship when the cartridge is closed, as shown in FIG. 1 or in aligned relationship when the cartridge is open as shown in FIG. 2.

A pair of radially spaced arcuate ribs 20 are formed on each of the walls 13 and 14 and are received in mating grooves formed in walls 16 and 17 for guiding the rotational movements of shell 10. Conveniently, a knob 24 is mounted on wall 13 to facilitate movement of shell 10. As shown, said knob is seated in recesses 25 formed in the ends of wall 16 when shell 10 is rotated to the cartridge-open and closed positions.

The cartridge is adapted to house a coil of magnetic tape 26 wound on a reel 28. As best shown in FIG. 3, the upper and lower faces of the reel have annular successively stepped down shoulders 30, 31, and 32. With the cartridge in its closed position the shoulders 30 will be supported against the inner faces of walls 16 and 17 and the shoulders 31 will be supported against the inner faces of walls 13 and 14 for holding the reel and tape in axially fixed position in the cartridge. The shoulders 32 provide an axial spacing between the tape and the walls 13, 14, 16, and 17.

When the cartridge is in its open position shown in FIG. 2, the tape 26 can be wound on and off the reel 28. In order to prevent the shells from rubbing against the reel during its rotational movement as the tape is wound on or off the reel, the reel is advanced outwardly during unwinding and inwardly during winding, with respect to the cartridge. Such relative movement between the cartridge and reel can be accomplished by any conventional means on the tape deck. As shown in FIG. 4, the opposed inner faces of the elongated ends of walls 13 and 14 are undercut along the inner edges of said walls, as at 34, to prevent said walls from rubbing against the opposed faces of the reel as it is moved inwardly toward and outwardly from the cartridge.

As will be apparent, if the diameter of the tape on the reel is greater than the chordal distance between the ends of the wall 15, the tape and reel can not be manually inserted into the open cartridge and the tape will have to be wound onto the reel as said reel is moved into the open cartridge.

While the cartridge has been described as being used with a flangeless reel, it is to be understood, of course, that a flanged reel can be employed with the cartridge if desired.

I claim:

1. A cartridge for a reel of magnetic tape, comprising a channeled arcuate outer shell, and a channeled arcuate inner shell having a greater arcuate extent than the outer shell and rotatably mounted in said outer shell, each of said shells being open along its inner circumference, said inner shell being movable between a cartridge-closed position in which said shells define a complete annulus and a cartridge-open position in which said shells define a partial annulus, and cooperating guide means on said shells for guiding the movement of said inner shell with respect to said outer shell.

2. The invention as set forth in claim 1 in which each of said shells is formed from an upper and lower wall interconnected at their outer edge by an arcuate end wall, the end wall of said inner shell having a greater arcuate extent than the upper, lower, and end walls of said outer shell and the upper and lower walls of said inner shell having a greater arcuate extent than the end wall of the inner shell and projecting beyond the ends of said inner shell end wall.

3. The invention as set forth in claim 2 with the addition that the inner edges of the opposed faces of the upper and lower walls of said inner shell are undercut at the ends of said walls.

4. The invention as set forth in claim 1 with the addition that a knob is mounted on said inner shell.

5. In combination with a reel having a plurality of pairs of successively stepped down annular shoulders in its opposed faces, a cartridge comprising a first arcuate shell having a pair of parallel walls adapted to be disposed in abutting engagement with one pair of said shoulders, and a second arcuate shell rotatably mounted in said first shell and having a pair of parallel walls adapted to be disposed in abutting engagement with another pair of said shoulders, said second shell being movable between a cartridge-closed position in which said shells extend circumferentially around said reel and a cartridge-open position in which said shells extend only partially around the circumference of said reel.

6. The invention as set forth in claim 5 in which said pair of parallel walls on said second shell are disposed in sliding engagement with said pair of parallel walls in said first shell.

References Cited

UNITED STATES PATENTS 1,887,298 11/1932 Friedman ------------ 215—12

FOREIGN PATENTS 10,363 1896 Great Britain.

JAMES B. MARBERT, *Primary Examiner.*